United States Patent [19]
Polstorff

[11] Patent Number: 4,965,429
[45] Date of Patent: Oct. 23, 1990

[54] ELECTROSTATICALLY SUSPENDED ROTOR FOR ANGULAR ENCODER

[75] Inventor: Walter Polstorff, Huntsville, Ala.

[73] Assignee: The United States of America as represented by the Administrator of the National Aeronautics and Space Adminstration, Washington, D.C.

[21] Appl. No.: 396,262

[22] Filed: Aug. 21, 1989

[51] Int. Cl.$^5$ ............................................. B23K 26/00
[52] U.S. Cl. ............................................. 219/121.68
[58] Field of Search ...................... 219/121.68, 121.65, 219/121.6, 121.85; 310/90.5

[56] References Cited

U.S. PATENT DOCUMENTS

| | | | |
|---|---|---|---|
| 3,262,327 | 7/1966 | Cohen | 74/5 |
| 3,845,995 | 11/1974 | Wehde | 308/10 |
| 3,902,374 | 9/1975 | Hoffman, et al. | 73/504 X |
| 4,038,663 | 7/1977 | Day | 346/1 |
| 4,406,939 | 9/1983 | Golker | 219/121 LJ |
| 4,587,860 | 5/1986 | Audren | 74/5 F |
| 4,610,172 | 9/1986 | Mickle | 74/5.46 |
| 4,862,752 | 9/1989 | Hort | 361/298 X |

Primary Examiner—C. L. Albrition
Attorney, Agent, or Firm—William J. Sheehan; John R. Manning; Jerry L. Seeman

[57] ABSTRACT

Apparatus for engraving a code strip with coded markings is disclosed. The code strip is attached for rotation to a cylindrical rotor which is mounted within the cavity of a stator. The stator carries electrodes on its top and side walls to which high potentials are applied to electrostatically suspend the rotor. Circuit means sense the position of the rotor with respect to the stator electrodes and adjust the potential to maintain the rotor at its desired location. A drive motor is connectable to the rotor through a drive shaft to initially lift the rotor into the desired location within the stator and to rotate it at the desired speed. Thereafter, the drive shaft is disconnected from the rotor, and the rotor continues to spin at a highly stable angular velocity, supported only by the electrostatic fields.

20 Claims, 5 Drawing Sheets

ELECTROSTATICALLY SUSPENDED ROTOR FOR ANGULAR ENCODER

The invention described herein was made by an employee of the United States Government and may be manufactured and used by or for the Government for Governmental purposes without the payment of any royalties thereon or therefor.

BACKGROUND OF THE INVENTION

The present invention is directed, in general, to apparatus for engraving coded data on a rotating disc, and more particularly to a rotor for supporting the code disc and to the drive mechanism and circuitry for rotating the disc.

The techniques for producing high resolution, precise patterns on code discs and the like are highly developed, and the procedures for producing such patterns on materials such as film, plastic, quartz, glass or other substrates are well known. For example, drafting techniques are available, wherein a master drawing of the code pattern is produced which is then photographically reduced to its final size. A further example is the use of metal backed papers and coated glass scribing materials, together with devices which guide the marking tools in precise X and Y coordinates, by which it is possible to produce patterns as large as four feet square with an accuracy of a few thousandths of an inch. Patterns produced by such methods, while somewhat limited in ultimate accuracy, are practically unlimited in design capability.

Another technique is to produce the coded patterns mechanically by means of precision "dividing engines" wherein optically polished diamonds are used to cut fine, parallel-sided lines through an opaque coating on polished glass master blanks. Such machines are capable of producing a divided circle that is accurate to one part in a million. Such machines usually limit the choice of pattern to relatively fine, radial, parallel, or circular lines or to FIGS. that can be applied to the lines by pentagraph methods. However, by mounting small optical projectors over the platens of such dividing engines, it is possible to project other pattern shapes onto the surface to be engraved, and by stepping the plate at precise and discrete intervals and turning the projector lamp on only when the engine is holding the plate stationary, additional patterns can be produced.

Another technique for producing encoded discs is described in U.S. Pat. No. 4,406,939 wherein a code pattern is inscribed on the surface of a coated disc by means of a laser beam transmitter. The disc is precisely positioned in relation to the laser beam transmitter by an angular step control device and by mounting the disc on the shaft before engraving the pattern, the pattern will be precisely centered on the disc. To obtain synchronization between the laser and the position of the disc, the disc drive motor and the laser beam transmitter are operated under the control of the same clock pulse generator. The motor may be a synchronous motor with its operating frequency derived from the clock pulse generator by a frequency divider. Such devices are limited in their accuracy, however, by the accuracy of the drive motor and the mechanical connections between that motor and the disc to be engraved. Prior devices also suffer a reduction in accuracy during the course of engraving a coded disc, because of the accumulation of errors which, even if minor to begin with, can gradually result in a loss of the required precision.

SUMMARY OF THE INVENTION

Briefly, in accordance with the present invention, a disc which is to be engraved with coded markings is mounted on or attached to a cylindrical rotor having a vertical axis. This rotor is mounted within the cavity of a stator operated in a high vacuum and its position as well as the orientation of its axis is controlled by electrostatic fields. The electrostatic fields suspend the rotor within the stator so that it is almost friction free in its rotation, allowing the rate of rotation of the rotor to be measured with an accuracy comparable to a quartz oscillator. Although electrostatic suspension has been used for rotary devices in the past, for example with gyroscopes, such devices have utilized rotors having spherical shapes and were subject to only limited control. The present device, on the other hand, utilizes a hollow cylinder which can be controlled both as to its motion and as to its attitude; that is, as to its rotation and to the angle of its axis of rotation with respect to the vertical axis of the device.

To control the electrostatic suspension of the rotor and the orientation of its axis, a plurality of electrostatic plates are mounted on the top wall of the stator cavity. To control the lateral position of the rotor within the stator, a plurality of side electrodes are fixed on the interior cylindrical side wall of the stator. These side electrodes interact with a conductive metal film covering the rotor to control its lateral position. The top and side wall fields are all balanced to maintain a near zero potential at the rotor to thereby avoid interaction of the electrostatic field with the operation of the optical engraving system, to be described. When the rotor is centered and level in the stator cavity, no resultant lateral force exists between the rotor and the side wall electrodes. In addition, the sum of the charge induced by voltages on the side wall electrodes and the sum of the charge induced by the voltages on the top electrodes are balanced, with no charge being present on the rotor facing the bottom electrode of the stator.

The rotor is cylindrical, having a top wall, a cylindrical side wall, and a bottom wall and has a high rotational symmetry. Preferably, the rotor is formed of a quartz glass that is resistant to changes in dimensions with changes in temperature, and is coated with a thin metal film, preferably copper or chromium covered by copper. The bottom wall of the rotor is the disc which is to be encoded, and thus the bottom surface thereof carries a thin code strip, which may be a layer of platinum, in the region of the disc where the encoding is to take place. This thin platinum layer thus forms an annular layer near the outer edge of the rotor in conductive contact with the copper covering the remaining rotor surface.

The stator comprises a cylindrical housing having a top wall, a cylindrical side wall, and a bottom wall which form a cylindrical stator cavity to receive the rotor. The stator top wall carries the top electrodes, which function to lift the rotor and to control its attitude, while the side wall carries spaced electrodes to which signals are applied for lateral position control of the rotor. The bottom wall of the stator is the bottom electrode. A bell jar or other suitable vacuum device surrounds the stator and allows the rotor to be operated in a vacuum, thereby virtually eliminating friction in the motion of the rotor.

The bottom electrode of the stator includes a plurality of apertures which provide access to the coding strip located on the bottom of the rotor. Suitable sources of laser light beams are aligned with the apertures and are controlled and focused to engrave the rotor code disc to produce encoded patterns on the disc surface. The bottom wall of the stator also incorporates a central aperture through which a suitable lifter device contacts the rotor to lift it above the bottom electrode of the stator, so that it can rotate. A drive motor is coupled to the rotor through a suitable coupling so that the motor itself can be located outside the stator and outside the vacuum environment. After the lifter device lifts the rotor and the drive motor initiates its rotation, the lifter is retracted and the electrostatic suspension takes over the support of the rotor. After any transients have decayed and the rate of rotation of the rotor has been determined with the desired precision, the encoding process can be started so as to engrave the code strip on the lower surface of the disc to thereby produce the desired pattern with accuracy and reliability.

The engraving of the disc by laser is based on marking the disc by evaporation. Noble metals, such as platinum, are preferred as the medium for the encoding, since these metals are resistant to corrosion and the engraving has minimal adverse effects on the vacuum. However, the burst of energy provided by laser light pulses to produce the desired markings result in a rapid build up of local pressure which, in the presence of high electric fields, could result in avalanche gas discharges which would distort the electric fields necessary for the suspension system. Accordingly, it is important to balance the charge induced on the rotor by the top electrodes with charge of opposite sign induced on the rotor by the side electrodes to ensure a field-free space between the rotor and the bottom stator electrode. Furthermore, the engraving operation produces within the device a build up of condensates which can attenuate the laser light and can affect the laser optics, thereby reducing the laser's effectiveness in producing precise and accurate patterns on the disc. To prevent such a build up, a co-rotating transparent disc is mounted between the bottom electrode of the stator and the mounting platform of the vacuum chamber. This transparent disc is rotated by the same drive motor which is used to start the rotation of the rotor, and serves to move condensates away from the laser path.

In order to maintain the rotor actuators axis in alignment with the vertical, a closed loop platform with lifters as actuators and a pair of tilt meters, as sensors are mounted on the stator base plate, or mounting platform outside the vacuum envelope to provide feedback signals to four actuators located between the side wall and the top wall of the stator, or between the stator and the mounting platform These actuators adjust the position of the top wall to maintain it in a horizontal attitude so that the rotor, suspension force produced by the top electrodes on the top wall, will be aligned with the gravity vector.

Deviations in attitude and position during rotation of the rotor are sensed by capacity measurements which utilize the electrode plates mounted on the stator. The capacity of the electrodes is measured in differential capacity bridges by means of sign sensitive error detectors. The outputs of these detectors modify the voltages supplied to the electrodes by fast charge/discharge circuitry. The changes in voltages supplied to the electrodes change the attitude and position of the rotor to keep its axis in alignment with the vertical and to keep the rotor centered in the stator. In place of the capacity measurements, optical sensors may also be used to detect the position of the rotor and to provide correcting signals.

BRIEF DESCRIPTION OF THE DRAWINGS

The foregoing and additional objects, features, and advantages of the present invention will become apparent from a consideration of the following detailed description of a preferred embodiment thereof, taken in conjunction with the accompanying drawings, in which.

DESCRIPTION OF PREFERRED EMBODIMENT

Figure 2:
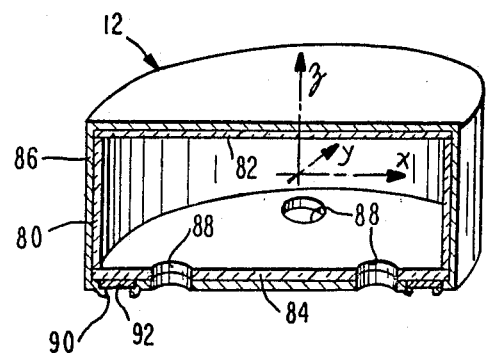
FIG. 2 is a perspective cross-sectional view of the rotor for the encoder of FIG. 1.
Figure 1:
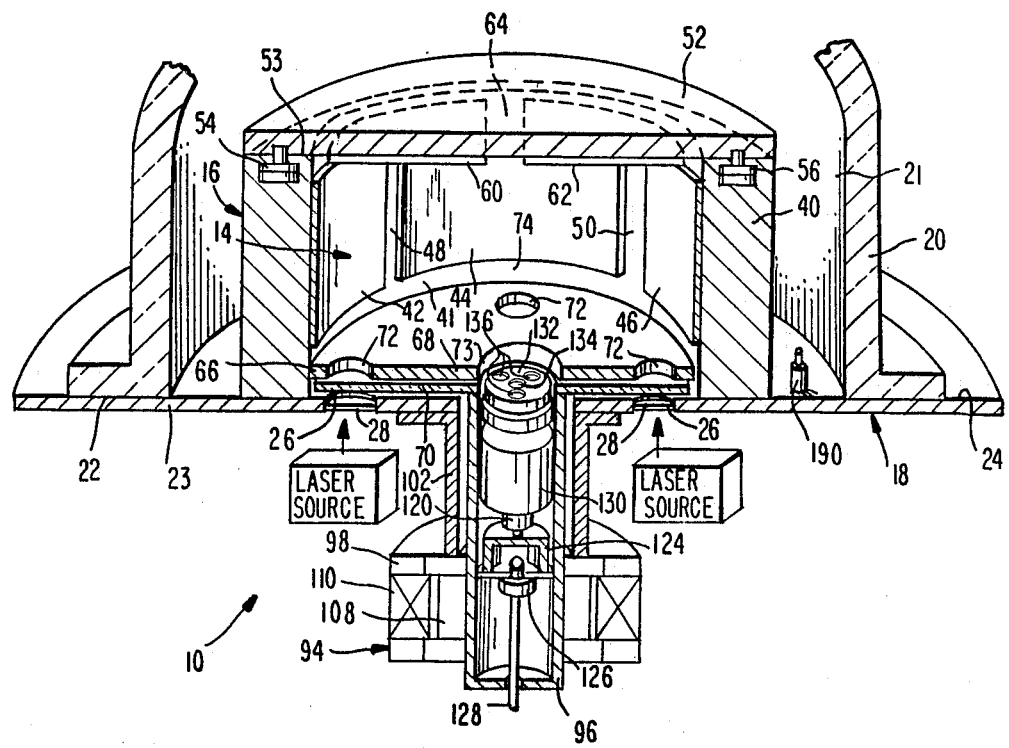
FIG. 1 is perspective cross-sectional view of the stator portion, of the rotary encoder of the present invention.
Figure 3:
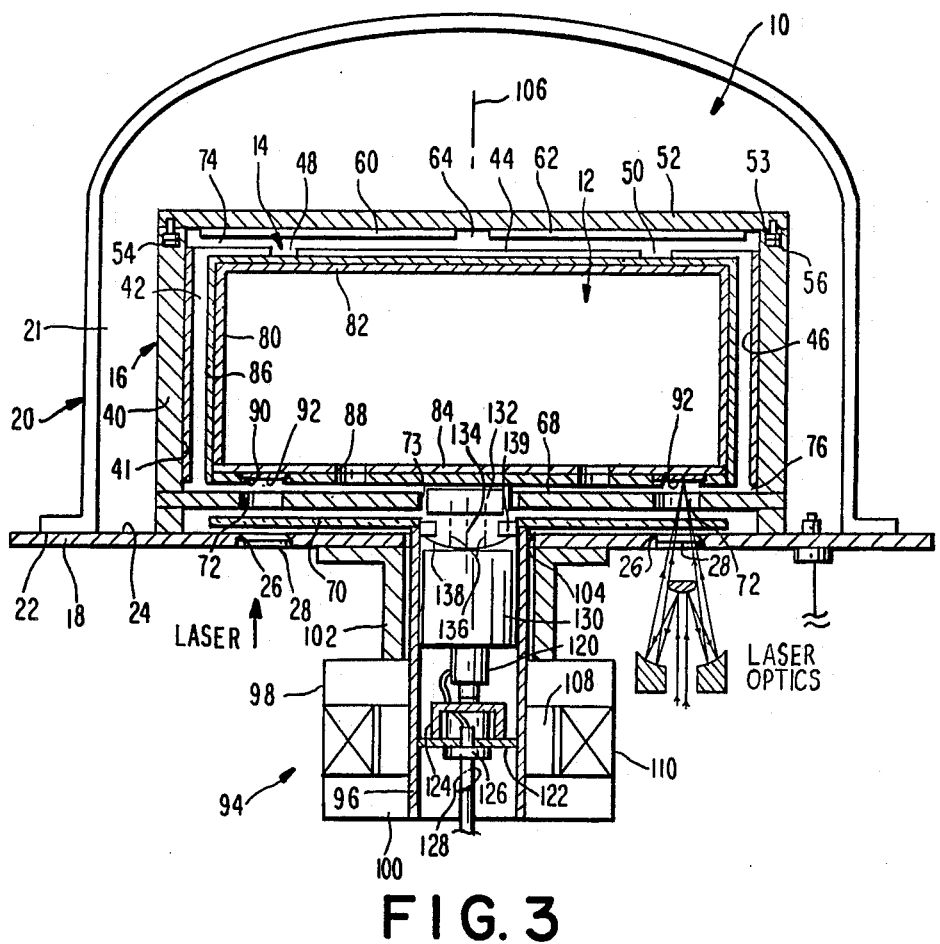
FIG. 3 is a cross-sectional view of the assembled encoder, showing the relationship of the rotor and stator, and in addition showing the optics for directing laser beams to a code strip carried by the rotor.

Turning now to a more detailed consideration of the present invention, there is illustrated in FIGS. 1, 2 and 3 an encoder device 10 which includes a rotor 12 mounted within the cylindrical cavity 14 formed by a generally cylindrical stator 16. The stator is mounted on a mounting platform, or base plate 18 which, together with a bell jar cover 20, provides an air tight chamber 21 for the rotor and stator in which a suitable high vacuum is produced to facilitate the operation of the encoder and encoding process. The cover 20 may be glass, with an air tight seal being formed at the juncture 22 between the cover and the upper surface 24 of the mounting platform 18 in conventional manner. The mounting platform preferably incorporates four apertures, such as those illustrated at 26, spaced equidistantly from the central axis of the stator. The engraving beams, to be described, pass through these apertures into the interior of the stator. The apertures 26 are sealed by thin glass plates 28 mounted flush with the top surface 24 of base plate 18 to maintain the integrity of the vacuum chamber 21. The apertures 26 allow the optical system to be mounted outside the vacuum chamber to facilitate access and control before the encoding operation.

The stator 16 includes a vertical, generally cylindrical side wall 40 which rests on, and is secured to, the upper surface 24 of mounting plate 18. The side wall carries on its inner surface 41 four spaced, stator electrodes, three of which are shown in FIG. 1 at 42, 44 and 46. These stator electrodes cover essentially the entire inner surface of the stator wall 40 but are spaced apart by a few millimeters to provide gaps, such as those illustrated at 48 and 50 on the side wall. These gaps provide evacuation routes for the cavity 14.

The stator 16 also includes a top wall 52 which is mounted on the top edge 53 of the side wall 40 and may be positioned there by means of four spaced piezoelectric actuators, two of which are illustrated in FIGS. 1 and 3 at 54 and 56. These actuators hold the top wall 52 in lateral alignment with the side wall 40 and are energizable to adjust the vertical positioning of the top wall 52 so as to maintain it perpendicular to the vertical gravity gradient, with which the axis 106 of the stator is aligned. The actuators can also be adjusted for lateral position control of the rotor. As an alternative, the actuators 56, 54 may be positioned between the mounting plate 18 and the side wall 40. The actuators are positioned equidistantly around the wall to permit the axis of the stator to be aligned with the vertical gravity gradient.

The lower surface of the top wall carries four top wall electrodes, two of which are illustrated at 60 and 62. These electrodes are arranged in four quadrants and are spaced by narrow gaps, such as that illustrated at 64, which may be on the order of 7 millimeters wide for a stator having an interior radius of, for example, on the order of 0.12 meter.

The bottom wall of the stator cavity 14 is formed by a base electrode 68 which is below the rotor 12 and above a transparent disk 70, to be described. The electrode 68 extends to the side wall 40 and has circular cutouts 72 aligned with the four apertures 26 in the mounting plate 18 and includes a central aperture 73.

The electrodes 42 on the side wall 16 extend substantially the full height of the side wall, but at their top and bottom edges are spaced from the top and bottom electrodes by gaps 74 and 76 of about 7 millimeters, as indicated in FIG. 3. These gaps between the top and side electrodes and between the bottom and side electrodes prevent field emissions when voltages are applied to the electrodes for suspension of the rotor.

The rotor 12, illustrated in FIGS. 2 and 3, fits within the stator cavity 14 and is freely rotatable therewithin. The rotor consists of a cylindrical side wall 80, a top wall 82, and a bottom wall 84. The top and bottom walls 82 and 84 are disc-shaped and have their outer peripheral edges flush with the outer surface of side wall 80. The bottom wall 84 is detachable from the rotor. The rotor walls 80, 82 and 84 are preferably formed of quartz, and the entire rotor is covered with a uniform, thin metallic film 86, except for an annular film-free ring 90. The film 86 preferably is copper, or copper applied over a thin film of chromium to improve adhesion to the quartz surface. The bottom wall of the rotor includes one or more apertures indicated at 88, which allow for evacuation of the interior of the rotor when the interior of the bell jar 20 is evacuated. In this regard, it should be noted that the interior of the stator is not sealed, particularly with the top wall 52 adjusted by the actuators 54 and 56.

Deposited on the outer surface of the bottom wall 84, within the ring 90 and in contact with the subsequently added metal film 86, is a code strip 92 which is to be engraved to produce the desired code pattern. The code strip is generally annular in shape, and extends around the periphery of the bottom wall 84 for rotation with the rotor 12. The code strip preferably is of platinum, but may be of some other material suitable for engraving by a laser. The code strip is deposited directly on the surface of the quartz wall 84 with the conductive film 86 overlapping both sides of the strip to provide contact therebetween. When the rotor is positioned in the cavity 14, as illustrated in FIG. 3, the code strip 92 will be aligned with the four apertures 26 to allow access to the code strip by laser light, split into four equal beams.

The rotation of the rotor is started by means of a suitable drive motor 94 having a rotatable, hollow shaft 96 which is part of a vaccum tight feed-through and which is supported by a pair of precision bearings 98 and 100. The shaft 96 is mounted within a cylindrical motor support 102 secured to the base plate 18 and extends through a central aperture 104 in the base plate. The shaft 96 is coaxial with the central axis 106 of the stator 16. Drive motor 94 includes a rotor 108 connected to shaft 96 and a surrounding motor stator 110 energizable to drive the shaft 96.

Interposed between the bottom electrode 66 and the base plate 18 is a rotatable guard disc 70, which is mounted for rotation on the shaft 96. The guard disc 70 is transparent, and preferably is of quartz, to allow laser light passing through aperture 26 to strike the code strip 92.

Mounted within the hollow shaft 96 is a piezoelectric lifter 120 which serves to lift the rotor 12 to enable it to assume a "free floating" condition within the stator 16, when it is suspended entirely by electrostatic forces supplied by electric potentials applied to the electrodes on the walls of stator 16. The lifter 120 is supported in the rotary shaft 96 by a vacuum tight plug 122 on which is mounted a tripod 124. The lower end of lifter 120 rests on the top of the tripod with the lifter being coaxial with the axis 106. A coaxial electrical feed-through connector 126 is mounted in plug 122, to pass a control line 128 into the evacuated section of shaft 96 for connection to piezo lifter 120 to supply a control voltage thereto.

The lifter 120 is surrounded by a cylindrical guide 130, which positions it axially within shaft 96, but allows it to expand in an axial direction upon application of a control voltage. A clutch plate 132, which extends through aperture 73 in electrode 68 and supports rotor 12 during start-up, is secured to the upper end of the piezoelectric lifter 120 by means of a central screw 134. The plate can be levelled with respect to the axis of the lifter by three adjuster screws 136 which are threaded through the clutch plate. The bottom ends of screws 136 abut the top surface of guide 130 to adjust the level of the clutch plate 132 with respect to the guide 130. A spring 138 is located between an annulus 139, which is threaded into the hollow shaft 96, and the cylindrical guide 130. Spring tension can be varied by adjusting the position of the annulus 139 within the shaft 96. The spring 138 is used to assist in the rapid downward motion of the clutch plate 132 upon disengagement with the rotor 12.

The top surface of clutch 132 preferably is covered with a release coating, such as Teflon film, to facilitate separation of the rotor 12 from plate 132 when the clutch plate is withdrawn from the rotor and the rotor is launched into its floating condition, where it is electrostatically suspended in the stator 16 by the potentials applied to the stator electrodes. The piezoelectric lifter 120 extends sufficiently to lift the rotor about 38 microns above the bottom electrode 68 during startup rotation.

The guard disc 70 is mounted for rotation on shaft 96 and extends radially outwardly from the shaft 96 between the apertures 26 and 72, and thus isolates the glass plates 28 from the code strip 92. When the code strip is engraved by a laser beam, particulate matter is released by the code strip, and in the absence of the disc, that material would condense on the laser optics, i.e., on the glass plates 28. The condensate would close off the apertures 26, and would not only attenuate the laser beam, but would compromise the focus of the laser optics. The rotating guard disc 70 is interposed between the code strip and the laser optics so that the condensate is intercepted by the surface of the disc, thereby protecting the laser optics. Furthermore, the rotation of the disc distributes the condensate around the surface of the disc and reduces the effect of that material, thereby assures completion of the encoder process.

Figure 4:
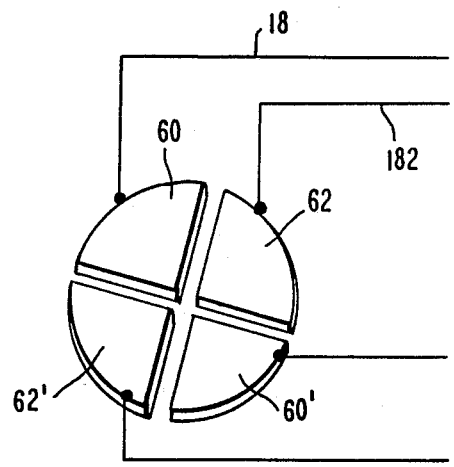
FIG. 4 is a diagrammatic view of the four electrodes carried on the top wall of the stator of FIG. 1.
Figure 5:
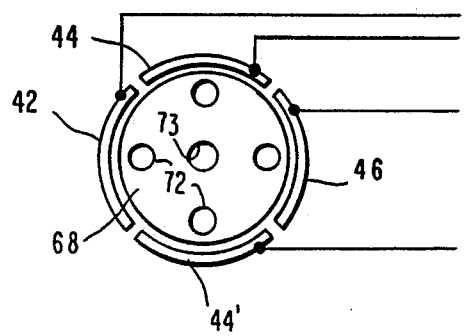
FIG. 5 is a diagrammatic view of the electrodes carried on the side walls and the bottom electrode of the stator of FIG. 1.
Figure 6:
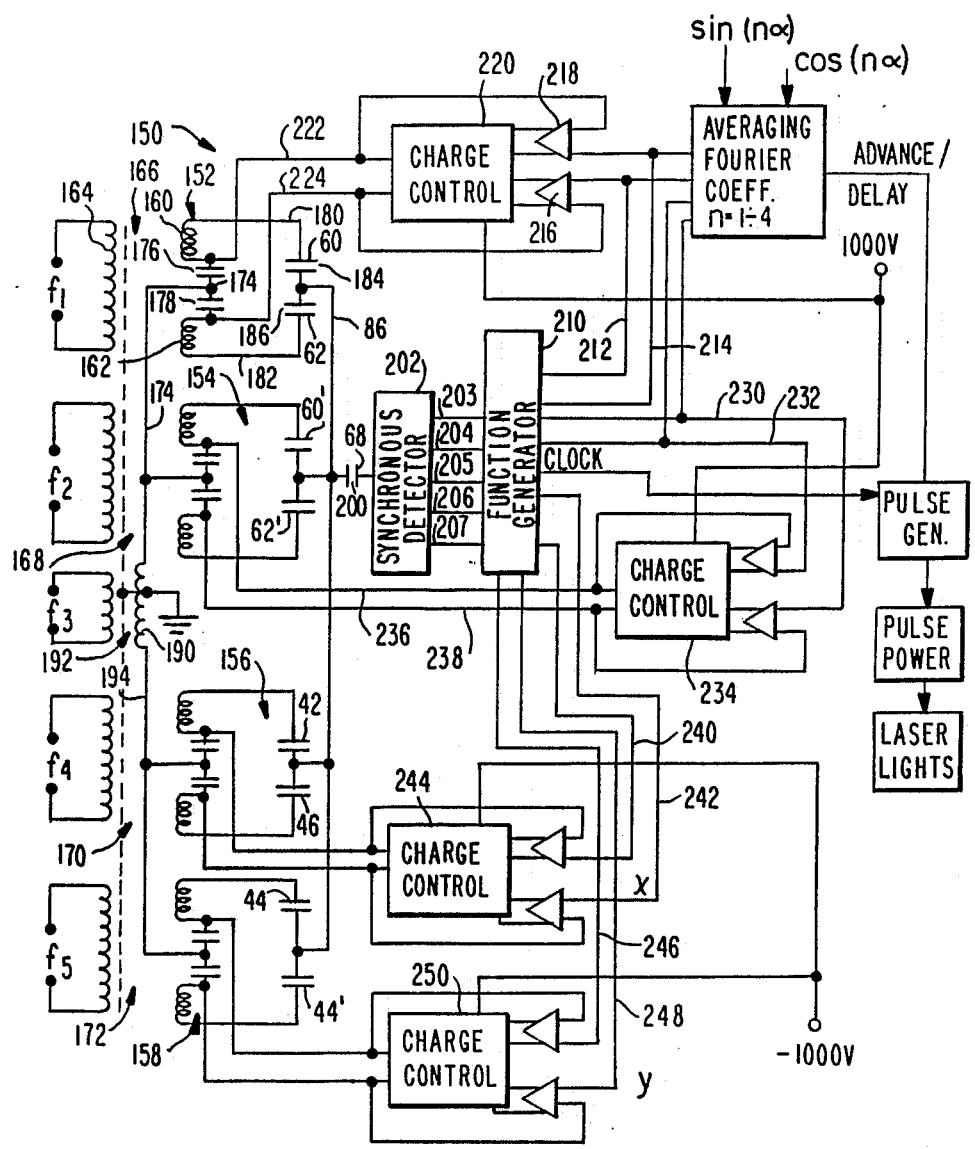
FIG. 6 is a schematic diagram of a preferred control circuit for the encoder of FIG. 1.

FIGS. 4 and 5 illustrate the electrodes carried by the top wall and side wall, respectively, of the stator 16. As illustrated in the cross sectional view of FIG. 1, the top wall 52 carries electrodes 60 and 62 in two quadrants thereof; and in the other two quadrants are located corresponding electrodes 62' and 60', as illustrated in FIG. 4. In similar manner, the cross sectional view of FIG. 1 illustrates three of the four electrodes carried by the side wall 40 of the stator 16. However, as illustrated in FIG. 5, the stator in reality carries four equally spaced electrodes 42, 44, 46 and 44'. The bottom of the stator is the bottom electrode 68, as illustrated in FIG. 5. The several electrodes illustrated in FIGS. 4 and 5 are connected in a control circuit which senses the location of the rotor within the stator 16 and which responds to errors in the location of the rotor to change the applied charge in a direction to return the rotor to the desired location. The potential applied to the electrodes produces an electrostatic force on the rotor which supports the rotor within the stator as it rotates, with the rotor floating freely within the stator, closely spaced from, but not contacting any of the stator surfaces. The location of the rotor is determined by sensing the distance between each of the electrodes and the rotor by means of a capacitive wheatstone bridge, wherein the capacity ratios of each of the electrode pairs and the rotor are measured. Control circuit 150 illustrated in FIG. 6 is a partial schematic diagram of this rotor balancing and support system. The control circuit includes four bridge circuits illustrated at 152, 154, 156 and 158. Each bridge circuit includes a pair of screened secondary windings such as those illustrated at 160 and 162 in bridge circuit 152 which form the secondary of a transformer having its primary winding 164 connected to a high frequency signal generator. In similar manner, bridge circuit 154 includes the secondary windings of a transformer 168, the bridge circuit 156 includes the secondary windings of a transformer 170, and bridge circuit 158 includes the secondary windings of a transformer 172. The primary windings of each of these transformers are connected to corresponding signal generator outputs so that signal $f_l$ is supplied to transformer 166, signal $f_2$ is supplied to transformer 168, and signals $f_4$ and $f_5$ are supplied to the bridge circuits 156 and 158, respectively. These signals may be of different frequencies, or of the same frequency but different phases.

The secondary windings 160 and 162 are connected to a common junction 174 through corresponding blocking capacitors 176 and 178, while the opposite ends of the windings are connected through lines 180 and 182 to the electrodes 60 and 62, respectively, carried by the top wall of stator 16. The conductive layer 86 on the rotor 12 forms the opposite plates of the capacitors 184 and 186 which are to be balanced by the bridge 152.

The bridge 154 is constructed in a similar manner to that of bridge 152, with one side of the bridge being connected to the common point 174 through blocking capacitors and the capacitors to be compared by the bridge being connected by way of electrodes 60' and 62' to the common point defined by the conductive surface 86 on the rotor. The junction 174 for the two bridge circuits 152 and 154 are connected to ground through one-half of the secondary winding 190 of a transformer 192.

The bridge circuits 156 and 158 are similar to circuits 152 and 154, but utilize the side electrodes 42, 46, 44 and 44' and the conductive layer 86 of the rotor as the capacitors for each bridge circuit. The junctions of the bridge circuits are connected to a common point 194 which in turn is connected to the second half of the secondary winding 190 of transformer 192. The transformer 192 is connected to the signal source $f_3$ which sends from the upper half of the secondary currents through the four top electrodes 60,, 62, 60', 62' to the rotor.

The lower half of the secondary sends opposing currents through the four side electrodes 42, 46, 44, and 44' to the rotor, effectively comparing the sum of the top capacities to the rotor with the sum of the cylindrical side capacities to the rotor.

Balance is obtained when the rotor's vertical position, Z, equalizes both capacity sums. Supporting the rotor's weight requires a specific electrical field strength E. The corresponding variation of the voltage at the top electrodes thus is a direct reading of the gap but also indicative of the variation of the sum of the side capacities, for example, as a function of the rotation angle $\alpha$.

The averaging circuit 195 performs signal analysis of the sum of the four top electrode voltages. Because of the almost friction-free motion, observations over many turns are possible, so that even minute variations of the capacities of the side electrodes with the rotor, as a function of the rotation angle, $\alpha$, can be determined with precision. These results are used to advance/delay the pulses (as a function of $\alpha$) for a highly uniform encoding of the rotor.

Each of the bridges is energized by its corresponding input signal $f_l$, $f_2$, $f_3$, $f_4$ and $f_5$, with the balance of the bridge depending upon the relative position of the rotor within the stator and with respect to the several electrodes on the stator. If the rotor is exactly centered in the stator, both vertically and horizontally, as well as being level with the stator, there will be a balance in each of the bridges, and there will be no net signal on conductive surface 86. The signal on the rotor is detected by means of the stator bottom electrode forming with the rotor the capacitor 200, coupling the outputs of the signals $f_l$, $f_2$, $f_3$, $f_4$, and $f_5$ to a synchronous detector 202 which produces corresponding output signals on lines 203, 204, 205, 206 or 207, depending upon the direction of imbalance of the rotor. The signals on lines 205, 206 and 207 represent errors in the rotor position coordinates x, y, z as illustrated in FIG. 2, while output signals on lines 203 and 204 represent tilting of the rotor about its axes around the X and Y directions. Thus, lateral shifting, vertical shifting, and tilting of the rotor are detected by the changes of the capacitors in the bridge circuits, and corresponding output signals are supplied on lines 203 through 207. These signals are supplied to a function generator 210 which produces corresponding command signals to vary the bias charges on the various electrodes to restore the rotor to its desired position within the stator. Thus, the function generator supplies correction voltages on lines 212 and 214 which are amplified at 216 and 218 and supplied through a charge controller 220 having a pair of output lines 222 and 224. These lines are connected to the junction between secondary windings 160 and capacitor 176, and to the junction between secondary winding 162 and capacitor 178, respectively, to supply biasing voltages to the bridge to return its output to a balanced condition. These voltages also vary the charges on the plates 60 and 62 of the top wall electrodes, and thus adjust the charge on these electrodes in a direction to restore the corresponding tilt angle component of the rotor 12. In similar manner, the function generator produces output signals on lines 230 and 232 which are supplied through charge control circuit 234 and lines 236 and 238 to adjust the balance of bridge circuit 154, thereby changing the charge level on electrodes 60' and 62' to adjust the other tilt angle components of the rotor. It will be understood that the charges applied to electrodes 60, 60', 62 and 62' are coordinated by the function generator 210 in accordance with the signals received by the synchronous detector 202.

The function generator also supplies output signals by way of lines 240 and 242 through charge control circuit 244 to re-balance bridge circuit 156 and supplies signals by way of lines 246 and 248 by way of charge control circuit 250 to re-balance bridge circuit 158. The signals supplied by the charge control circuits 244 and 250 are responsive to lateral shifts of the rotor 12 within the stator 16 which change the charges on the side electrodes 42, 44, 46 and 44', and the function generator responds to changes in the outputs of the bridges 156 and 158 in response to such lateral shifting to produce signals which restore the rotor to its central position.

Any imbalance in the sum of the capacities of the top versus the sum of the capacities of the side electrodes with the rotor produces a differential current through the winding 190 of transformer 192, thereby providing an output signal $f_3$ to the synchronous detector 202 which represents the deviation in the Z direction (See FIG. 2) of the rotor from its position of balance. When the rotor is correctly placed, this output signal will be zero, for $\Sigma C_s = \Sigma C_T$ and $U_s$ will be set for $\Sigma C_s U_s = -\Sigma C_T U_T$, thus maintaining the rotor at zero potential.

It will be understood that the piezoelectric devices 54 and 56, and corresponding devices 54' and 56' displaced 90° from the illustrated devices, may also be used to tilt the top wall 52 of the stator so as to adjust the x, y position of the rotor within the stator.

Figure 7:
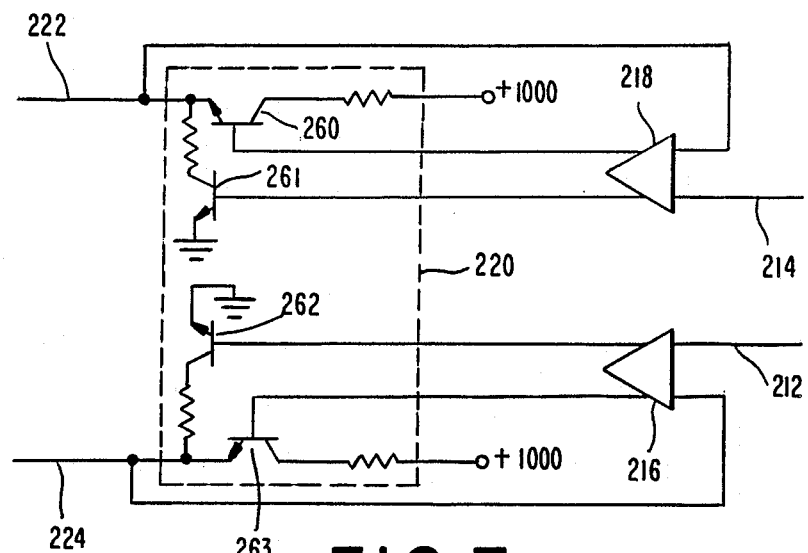
FIG. 7 is a schematic diagram of a charge control circuit used in FIG. 6.

FIG. 7 illustrates in schematic form a charge control circuit 220 suitable for use in the system of FIG. 6. As there illustrated, the output signals from the function generator 210 are supplied through amplifiers 212 and 218 to trigger the operation of transistors 260 through 263 to produce the desired balancing voltages on output lines 222 and 224 for application to the bridge circuit 152. The remaining charge control circuits are similarly constructed.

The electrostatic suspension system of FIG. 6 acts on the surface of the rotor. The center of these forces can be visualized by the intersection of 3 orthogonal planes of balance defined by $f_3=0$, $f_4=0$ and $f_5=0$. The inertial and gravity forces act on the center of mass (c.m.), the c.m. of the rotor. For a uniform motion of the rotor it is essential to have the c.m. as close as possible to the center of the suspension forces. Corrections in the c.m. locations are possible without affecting the center of the suspension force by removal of mass from the interior of the rotor. This can only be done prior to the assembly. The rotor will be floated upside down in a liquid matched for barely keeping the rotor afloat, the tilt of the rotor surface against the surface of the liquid will, by mass removal, be reduced to less than 1 arc sec. (in a selected rotor configuration this corresponds to a separation of the 2 centers by $\sim 0.27\mu$).

After assembly, balancing the bridges, functional testing of slaving the stator's top to the tiltmeter stabilized platform, activating the high voltage circuitry for the electrostatic suspension, (yet without energizing the electrodes), the bell jar is installed. When the pump down, bake-out, burn in have resulted in stable high vacuum, absence of spontaneous high electric field emissions, a final check on the rotor's c.m. and of the stator's alignment to the local vertical is made. The rotor will be lifted by the pieze 120 above the bottom electrode and the transition from support to electrostatic suspension will be enacted. Subsequently, the stator will be tilted by about 1000 arc sec and the ensuing pendulum motions will be observed (using an auxiliary marking track for read out through one of the windows 28). The 2 points of reversal of motion will be observed and the period will be measured thus determining the location of the c.m. (For C.M. as $0.27\mu$ the period is T≃1 hr 22 min.)

If the results are satisfactory the next step is the precision leveling of the stator top plate 52 after restoring the stator to the level position. The lateral control in one axis, say the x-axis, is deactivated by returning the corresponding pair of side-electrodes to ground potential, while doubling the voltages of the y-pair of electrodes (thus maintaining the charge balance between top- and side electrodes). The rotor is now free to follow any x-component of the projection of the gravity gradient in the stator top-plane, for example, for 0.1 arc sec. between the gravity gradient and the normal to the top plane measured in the x-direction the rotor would in the first second move by $2.4\mu$. By adjusting the corresponding x-pair of piezos (for example, 54 and 56), the movement can be arrested. Similarly, with adjustments in y the top plate's orientation relative to the gravity vector is completed.

Figure 8:
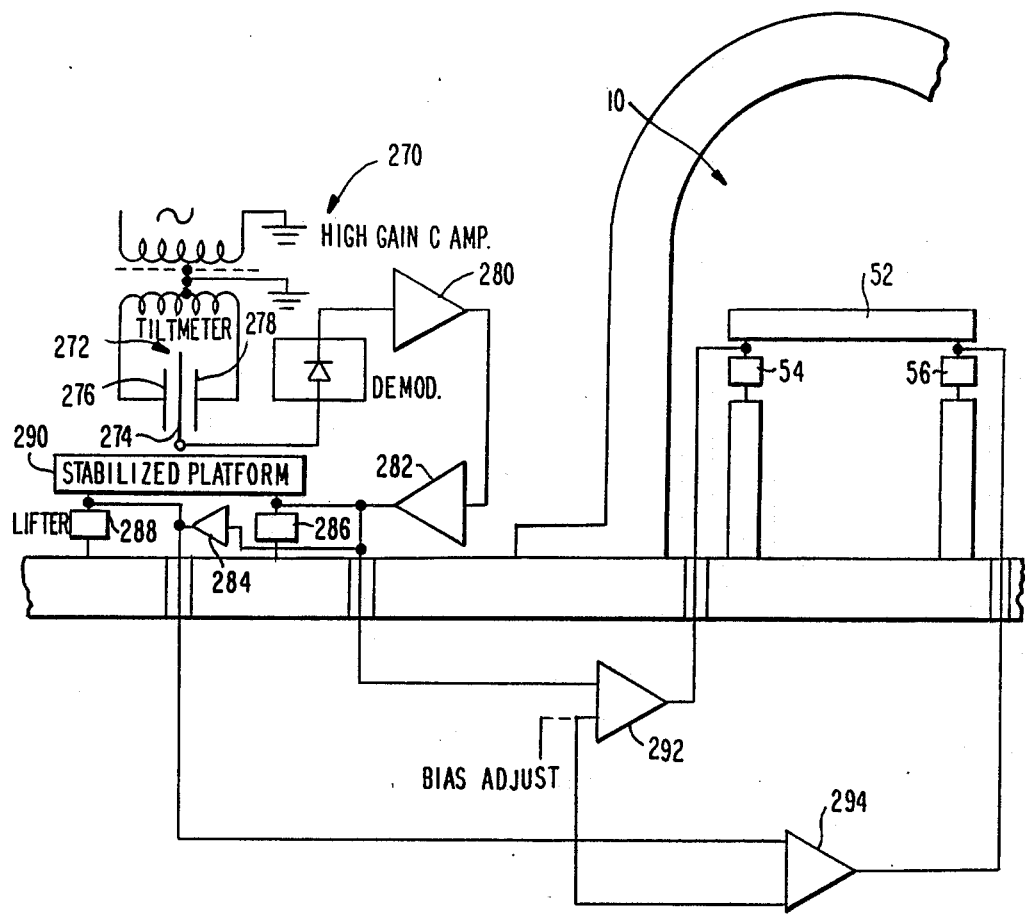
FIG. 8 is a schematic diagram of the tilt stabilized platform for the alignment of the top stator electrodes with the local vertical.

The adjustment of the top plate 52 can be accomplished by a tiltmeter 270 (see FIG. 8) in which a differential capacitor 272 includes a center plate 274 which is, in effect, the bob of a short plumbline (30 mm) swinging between two parallel electrodes 276 and 278 and damped by air friction. The center plate carries an imbalance signal which is demodulated and fed into a high gain d.c. amplifier 280. The amplified signal is fed through intermediate amplifiers 282 and 284 to control piezoelectric lifters 286 and 288, respectively, which counteract the tilt of the platform 290 on which the tiltmeter is mounted. The high gain amplifier 280 forces the error signal to close to zero as the platform 290 is leveled with respect to the platform 18 on which the electrostatic encoder is mounted, thus ensuring that the platform 290 closely follows the variations in the local vertical. Soft supports for the tiltmeter eliminate high frequency vibrations.

The imbalance signals supplied to piezoelectric lifters 286 and 288 are supplied by way of amplifiers 292 and 294 to corresponding lifters 54 and 56 which support the top plate 52, as diagrammatically illustrated in FIG.

8. Similar leveling is provided for the y-axis orientation of the top plate. Given the high sensitivity of the tiltmeters, stabilization down to m arc sec. is feasible (see FIG. 8). With the adjustment of the c.m. deviation from the center of geometry by buoyancy and autocollimator to less than 1 arc sec tilt of the rotor, the maximum calibration error within the 25 sec of encoding (such as symmetrical to the reversal of pendulum motion) is negligible.

After these final adjustments and verifications the rotor is returned from the electrostatic suspension back to the support by the clutch 132 which is energized to its elevated position above the stator bottom electrode. In this position the rotor is brought up by motor 94 to the desired rotational speed in preparation for the encoding process.

When the rotation of the rotor has stabilized, the piezoelectric lifter 120 is quickly moved downwardly to disengage the clutch surface from the rotor, leaving the rotor suspended solely by electrostatic forces and thus "free floating" within the stator. Because the rotation is essentially frictionless, the rotor will continue to turn and calculations show that such a rotor could continue to operate for a lifetime of 700 years with a rotational accuracy comparable with that of a quartz oscillator. The electrostatic charges on the electrode are continuously monitored and adjusted by the circuitry of FIG. 6 to maintain the rotor in its floating position.

The goal of high precision for the encoding requires verification of the stability of the rate of rotation, and by timing with a large number of cycles determination of the rate of rotation commensurate with the precision of the quartz clock is feasible. Analysis indicates that acceleration/deceleration due to centrifugal forces exceeds gaseous friction only for c.m.'s more than $25\mu$ from center of rotation. During this period the variations of the suspension voltage applied to the top electrodes will also be measured as a function of the rotation angle.

As already noted, the rotor will track the sum of its capacities to the side electrodes $$\sum_{i}^{4} C_{S\lambda}$$

with the sum of its capacities to the top elecrodes $$\sum_{i}^{4} C_{T\lambda}.$$

Variations of $C_s$ with the angle of rotation $\alpha$ are the result of deviations from rotational symmetry for both rotor and stator. It causes the rotor to periodically accelerate toward the max of $C_s(\alpha)$ and thus deviate from the uniform rate of rotation. The rotor weight enforces constant field strength, equivalent to constant charge at the top, but by balance also for the side. Thus there are 2 systems of energy conservation. In the z-coordinate system it is the potential energy in the gravity field and the electrical energy of the field between rotor and top electrodes. In the cylinder system it is the electrical field energy between rotor and stator and the kinetic energy of rotation. When disregarding transients it can be said that the charges of both systems are constant and opposite in sign. Thus, applying the conservation of energy, variations in the capacities $$\sum_{i}^{4} C_{S\lambda}$$

are directly related to changes in $\overline{U}_T$ and thus with determining $\overline{UHD}\ T(\alpha)$ a quantitative decision on advance and delay of the light pulses can be made to ensure a uniform encoding. The variations in $\overline{U}_T$ in the frequency band 0.01 Hz to 0.05 Hz are expected to be read out to the $10^{-6}$ V range; thus, angular deviations from the true angle on the encoder may be less than can be read out by the resolution of the read out system. Two concentric ellipses have been chosen as an analytical model for deviations of rotational symmetry for rotor and stator. Assuming the highest precision of a turning machine of $\pm 10$ nm the max deviation from uniform encoding has been calculated as 0.055 arc sec., without correction. The resultant variation of $C_s$ caused a $U_T(\alpha)$ variation of $\pm 20\mu$ V, with can be extracted from the nonsynchronous variations and used for corrections down to the 10 m arc sec level.

If it is found that the frequency band of 0.01 Hz $\div 0.05$ Hz is affected by the rotation of the transparent disc, that motor could be turned off for the measurement of this band to insure that indeed only the variation of $C_s(\alpha)$ is measured. The vacuum pump can be left on if a vibration free magnetically levitated pump is used.

Although the present invention has been described in terms of a preferred embodiment, variations and modifications may be made without departing from the true spirit and scope thereof as set forth in the following claims.

What is claimed is:

1. Apparatus for encoding a code strip, comprising:
   a stator having a cylindrical side wall, a top wall, and a bottom wall defining an inner cavity, said bottom wall comprising a bottom electrode;
   at least first and second flat lift electrodes mounted on the inner surface of said top wall;
   at least first and second lateral electrodes mounted on the inner surface of said side wall;
   a rotor having a cylindrical side wall, a top wall and a bottom wall located in and rotatable in said cavity;
   a thin electrically conductive coating substantially completely covering said rotor top, side, and bottom walls; and
   circuit means supplying electrical potential to said stator top and side electrodes to electrostatically suspend and position said rotor within said stator cavity.

2. The apparatus of claim 1, further including support means for mechanically supporting said rotor within said cavity above said stator bottom electrode.

3. The apparatus of claim 2, wherein said support means includes drive motor means for imparting rotation to said rotor.

4. The apparatus of claim 3, wherein said support means further includes a rotatable drive shaft driven by said drive motor, said drive shaft including clutch means engaging said rotor bottom wall for imparting rotation to said rotor upon rotation of said drive shaft.

5. The apparatus of claim 4, wherein said support means further includes lift means for selectively raising said clutch means into engagement with said rotor bottom wall to lift said rotor above said stator bottom electrode, and for lowering said clutch means away from said rotor when said rotor is electrostatically suspended in said cavity.

6. The apparatus of claim 3, wherein said circuit means includes means for detecting the position of said rotor with respect to said top and side electrodes, and for selectively varying the electrical potential supplied to said electrodes to maintain said rotor in a selected position within said stator cavity.

7. The apparatus of claim 6, wherein said means for detecting the position of said rotor comprises capacitive bridge circuit means.

8. The apparatus of claim 1, wherein said stator top wall carries four lift and ,tilt electrodes, said electrodes being symmetrical and covering substantially the entire inner surface of said stator top wall.

9. The apparatus of claim 1, wherein said stator side wall carries four lateral electrodes, said electrodes being symmetrical and covering substantially the entire inner surface of said side wall.

10. The apparatus of claim 9, wherein said stator top wall carries four lift electrodes, said electrodes being symmetrical and covering substantially the entire inner surface of said stator top wall.

11. The apparatus of claim 1, wherein said rotor further includes an annular code strip mounted on the outer surface of said rotor bottom wall.

12. The apparatus of claim 11, further including at least one aperture in said stator bottom wall aligned with said code strip; and
    optical means for directing an engraving beam into said stator to impinge on said code strip.

13. The apparatus of claim 12, further including guard means between said code strip and said optical means, said guard means being transparent to said engraving beam.

14. The apparatus of claim 13, wherein said engraving beam is a laser.

15. The apparatus of claim 13, further including support means for mechanically supporting said rotor within said cavity above said stator bottom electrode.

16. The apparatus of claim 15, wherein said rotor and said stator are coaxial with a substantially vertical axis, and wherein said support means includes a rotatable drive shaft coaxially aligned with said rotor.

17. The apparatus of claim 16, wherein said support means further includes a clutch, lift means for selectively moving said clutch into engagement with said rotor bottom wall to lift said rotor above the bottom wall, drive means energizable to rotate said rotor about said axis, said lift means being movable out of engagement with said rotor bottom wall when said rotor is electrostatically suspended in said cavity.

18. The apparatus of claim 17, wherein said circuit means includes means for detecting the position of said rotor with respect to said top and side electrodes, and for selectively varying the electrical potential supplied to said electrodes in response to the detection of lateral shifting or of tilting of said rotor with respect to said stator to maintain said rotor in a selected position within said stator cavity.

19. The apparatus of claim 18, wherein said means for detecting the position of said rotor comprises capacitive bridge circuit means, which is fully functional in the support as well as in the suspense mode.

20. The apparatus of claim 19, further including means enclosing said rotor and stator to provide a vacuum environment.

* * * * *